(12) United States Patent
Aromin

(10) Patent No.: US 10,916,935 B2
(45) Date of Patent: Feb. 9, 2021

(54) LEAKAGE CURRENT DETECTION AND INTERRUPTION (LCDI) DEVICE WITH IGNITION CONTAINMENT FEATURES

(71) Applicant: Victor Aromin, West Warwick, RI (US)

(72) Inventor: Victor Aromin, West Warwick, RI (US)

(73) Assignee: Tower Manufacturing Corp, Providence, RI (US)

( * ) Notice: Subject to any disclaimer, the term of this patent is extended or adjusted under 35 U.S.C. 154(b) by 214 days.

(21) Appl. No.: 16/186,671

(22) Filed: Nov. 12, 2018

(65) Prior Publication Data
US 2019/0165567 A1    May 30, 2019

Related U.S. Application Data

(60) Provisional application No. 62/707,979, filed on Nov. 28, 2017.

(51) Int. Cl.
| | |
|---|---|
| *H02H 7/22* | (2006.01) |
| *H01C 7/12* | (2006.01) |
| *H02H 1/00* | (2006.01) |
| *H01R 13/713* | (2006.01) |
| *H01R 13/70* | (2006.01) |
| *H01R 13/66* | (2006.01) |
| *H01R 103/00* | (2006.01) |
| *H01R 24/20* | (2011.01) |

(52) U.S. Cl.
CPC .............. *H02H 7/226* (2013.01); *H01C 7/12* (2013.01); *H01R 13/6683* (2013.01); *H01R 13/701* (2013.01); *H01R 13/7135* (2013.01); *H02H 1/0015* (2013.01); *H01R 24/20* (2013.01); *H01R 2103/00* (2013.01)

(58) Field of Classification Search
CPC ...... H02H 7/226; H02H 1/0015; H02H 3/167; H02H 3/16; H01C 7/12; H01R 13/6683; H01R 13/701; H01R 13/7135; H01R 24/20; H01R 2103/00
See application file for complete search history.

(56) References Cited

U.S. PATENT DOCUMENTS

| | | | | |
|---|---|---|---|---|
| 9,356,440 B2* | 5/2016 | Aromin | ................... | H02H 3/167 |
| 2002/0048133 A1* | 4/2002 | Jakwani | .................... | H01T 4/06 |
| | | | | 361/118 |
| 2015/0349517 A1* | 12/2015 | Li | ............................ | H02H 3/16 |
| | | | | 361/42 |

* cited by examiner

*Primary Examiner* — Matthew V Nguyen
*Assistant Examiner* — Jye-June Lee

(57) ABSTRACT

A Leakage Current Detection and Interruption (LCDI) device, for use as a safety device for a load cable. The LCDI circuit card assembly incorporates a load input cavity having fire retardant materials surrounding the load input terminals, a separated containment cavity structure for a first Metal Oxide Varistor (MOV), and a contact actuator which encases the switch or contact arm at the source input section of the LCDI. The circuit design incorporates redundant safety features for containment of spurious ignitions.

11 Claims, 13 Drawing Sheets

LEAKAGE CURRENT DETECTION AND INTERRUPTION (LCDI) DEVICE WITH IGNITION CONTAINMENT FEATURES

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 62/707,979 entitled "Leakage Detection and Interruption (LCDI) Device With Ignition Containment Features.", naming Victor Aromin as inventor, filed 28 Nov. 2017.

FIELD OF USE

The present invention relates generally to electrical safety devices and more particularly to a Leakage Detection and Interruption (LCDI) device having ignition containment features.

DESCRIPTION OF PRIOR ART (BACKGROUND)

Conventional electrical appliances typically receive alternating current (AC) power from a power supply, such as an electrical outlet, through a pair of conducting lines. The pair of conducting lines, often referred to as the line and neutral conductors, enable the electrical appliance, or load, to receive the current necessary to operate.

A power cable typically comprises at least two conducting lines through which current travels from the power source to the load. Specifically, a power cable typically comprises a power line and a neutral line. A metal sheath can be used to surround the power line and the neutral line in order to provide the power cable with arc sensing capabilities.

The connection of an electrical appliance to a power supply through a pair of conducting lines can create a number of potentially dangerous conditions. In particular, there exists the risk of ground fault and grounded neutral conditions in the conducting lines. A ground fault condition occurs when there is an imbalance between the currents flowing in the power and neutral lines. A grounded neutral condition occurs when the neutral line is grounded at the load.

Ground fault circuit interrupters are well known in the art and are commonly used to protect against ground fault and grounded neutral conditions. A ground fault circuit interrupter (GFCI) typically comprises a differential transformer with opposed primary windings, one primary winding being associated with the power line and the other primary winding being associated with the neutral line. If a ground fault condition should occur on the load side of the GFCI, the two primary windings will no longer cancel, thereby producing a flux flow in the core of the differential transformer. This resultant flux flow is detected by a secondary winding wrapped around the differential transformer core. In response thereto, the secondary winding produces a trip signal which, in turn, serves to open at least one of the conducting lines between the power supply and the load, thereby eliminating the dangerous condition.

While GFCI circuits of the type described above are well known and widely used in commerce to protect against ground fault and grounded neutral conditions, it should be noted that a power cable is susceptible to other types of hazardous conditions which are not protected against by a conventional GFCI circuit. As an example, it has been found that one type of arcing condition can occur between one of the conducting lines and the metal sheath which surrounds the conducting lines. It should be noted that the presence of this type of arcing condition between either the power line and the metal sheath or the neutral line and the metal sheath can result in a fire or other dangerous condition.

When an electrical spark jumps between two conductors or from one conductor to ground the spark represents an electrical discharge through the air and is objectionable because heat is produced as a byproduct of this unintentional "arcing" path. Such arcing faults are a leading cause of electrical fires. Arcing faults can occur in the same places that ground faults can occur—in fact, a ground fault would be called an arcing fault if it resulted in an electrical discharge, or spark, across an air gap. Arc fault detection is typically accomplished by monitoring the electrical current flow into a load and comparing the profile of this current flow to a characteristic "signature" that arcing faults will exhibit. It is known for ALCI enclosures to "burn up" during an internal fire or ignition creating extreme hazards and dangerous conditions.

In U.S. Pat. No. 7,525,777, to Aromin, V, incorporated herein by reference for all it discloses, new and improved safety circuits for a power cables are disclosed. The power cable includes two or more conducting lines and a metal sheath surrounding the conducting lines. The safety circuits sense the presence of an arcing condition between one of the conducting lines and the metal sheath, and in response thereto, opens at least one of the conducting lines between the power supply and the load.

Although a variety of safety circuits are available to shut down an ALCI is response to hazardous arcing conditions there is a need for an ALCI that can contain "burn up" during an internal fire through the use of fire retardant materials and structure located on the circuit assembly.

BRIEF SUMMARY

The foregoing and other problems are overcome, and other advantages are realized, in accordance with the presently preferred embodiments of these teachings. In accordance with one embodiment of the invention a Leakage Current Detection and Interruption Device (LCDI) with Ignition Containment features is disclosed.

The structure of the LCDI circuit card assembly incorporates a load input cavity having fire retardant materials surrounding the load input terminals, a separated containment cavity structure for a first Metal Oxide Varistor (MOV), a contact actuator which encases the switch or contact arm at the source input section of the LCDI, and a circuit design having redundant safety features for containment of spurious ignitions. Further, the particular placement of components on the circuit card assembly is to maximize the fire containment features of the LCDI. The circuit card assembly may incorporate either 120 Volt, 240 Volt 15 Amp, or 240 Volt 20 Amp source input conductors.

Components and circuit traces mounted and or adhered to the LCDI Circuit Card assembly are configured to minimize packaging density while simultaneously maximizing distances between component and circuit traces to conform to required safety standards, e.g., UL840, to prevent electric arcing and dielectric breakdown.

A safety circuit for a power cable is included and disposed on the circuit assembly which includes two or more conducting lines and a metal sheath surrounding the conducting lines. The safety circuit senses the presence of an arcing condition between one of the conducting lines and the metal sheath, and in response thereto, opens at least one of the conducting lines between the power supply and the load. The safety circuit and circuit card assembly may be mass produced, has a minimal number of parts, and can be easily assembled.

The safety circuit is for use with a power cable, said power cable connecting a power source with a load, said power cable comprising a power line, a neutral line and a metal sheath which surrounds the power line and the neutral line, said safety circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 13:
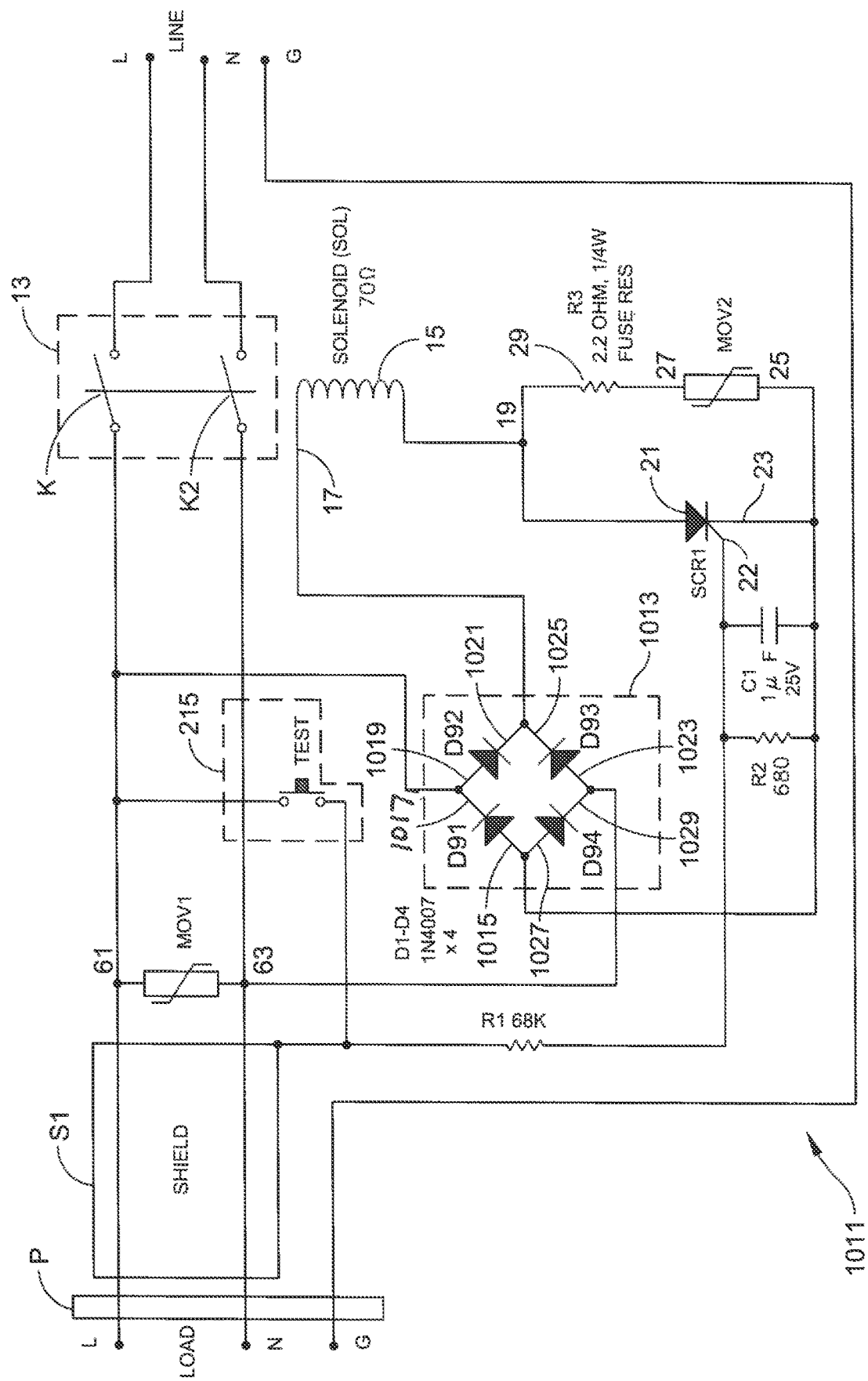
FIG. 13 is a schematic circuit diagram of an embodiment of a safety circuit used in the LCDI of the present invention.

Referring now to FIG. 13, there is shown a first embodiment of a safety circuit constructed according to the teachings of the present invention, the safety circuit being represented generally by reference numeral 1011. Safety circuit 1011 is designed principally for use as a safety device for a power cable P which connects a power source (i.e., a line) to a load, said power cable P including a power line L, a neutral line N, and a ground line G. Each of the power lines L and neutral lines N is wrapped with a metal sheath or other similar type of shielded wrapping.

The metal sheaths of the power and neutral lines L and N are, in turn, twisted together so as to effectively form a single metal sheath S1 which surrounds power line L and neutral line N. Ground line G remains electrically isolated from power line L and neutral line N.

As will be discussed in detail below, safety circuit 1011 interrupts the flow of current through power line L and neutral line N extending between the power source and the load when an arcing condition occurs either between power line L and metal sheath S1 or between neutral line N and metal sheath S1. As can be appreciated, the presence of an arcing condition either between power line L and metal sheath S1 or between neutral line N and metal sheath S1 can result in a fire or other dangerous condition.

Figure 1:
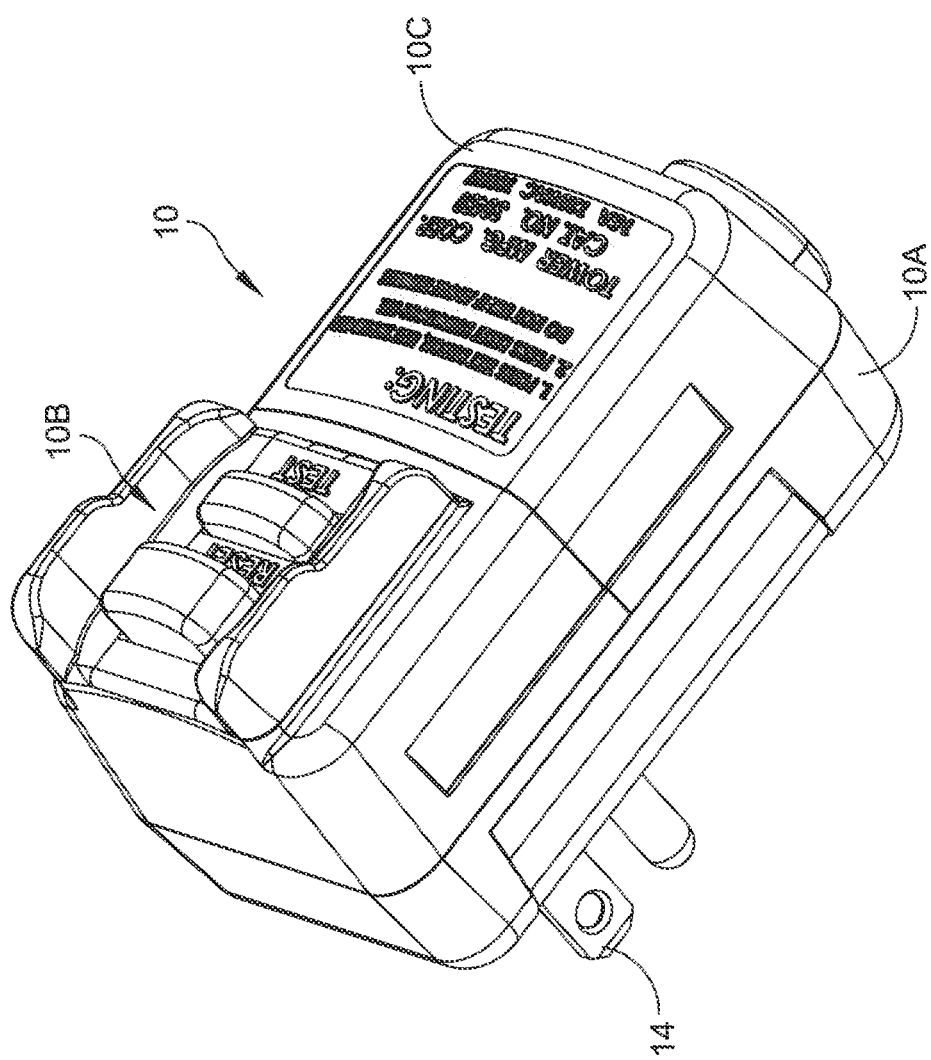
FIG. 1 is a perspective top view of a Leakage Current Detection and Interruption Device (LCDI) enclosure employing the principles of subject invention.

Safety circuit 1011 comprises a circuit breaker 13 which selectively opens and closes power line L and neutral line N. Circuit breaker 13 includes a first normally-closed switch K1 which is located in power line L between the power source and the load. Circuit breaker 13 also includes a second normally-closed switch K2 which is located in neutral line N between the power source and the load. Switches K1 and K2 can be positioned in either of two connective positions. Specifically, switches K1 and K2 can be positioned in either a first, or closed, position or a second, or open, position. With switches K1 and K2 disposed in their closed position, which is the opposite position as illustrated in FIG. 1, current is able to flow from the power source to the load. With switches K1 and K2 disposed in their open position, which is illustrated in FIG. 13, current is unable to flow from the power source to the load.

A metal-oxide varistor MOV1 protects against voltage surges in power and neutral conducting lines L and N. Metal-oxide varistor MOV1 preferably includes a first terminal 61 and a second terminal 63. First terminal 61 of metal-oxide varistor MOV1 is connected to power line L and second terminal 63 of metal-oxide varistor MOV1 is connected to neutral line N. When exposed to high transient voltage MOV1 will absorb the potentially destructive energy and dissipate it as heat. However, residual arcing voltage not suppressed by MOV1 and existing between power line L and metal sheath S, will travel from metal sheath S and passes through resistor R1 as described further below.

A solenoid SOL is ganged to the circuit breaker contacts of switches K1 and K2 and is responsible for selectively controlling the connective position of switches K1 and K2. Specifically, when solenoid SOL is de-energized, switches K1 and K2 remain in their closed positions. However, when solenoid SOL is energized, solenoid SOL moves and maintains switches K1 and K2 into their open positions. Solenoid SOL includes a winding 15 which includes a first end 17 and a second end 19, second end 19 being connected to SCR1 and MOV2 and the first end 17 being connected to diode bridge 1013.

It should be noted that safety circuit 1011 is not limited to the use of solenoid SOL to selectively move and maintain the connective position of switches K1 and K2. Rather, it is to be understood that solenoid SOL could be replaced with alternative types of circuit opening devices which are well known in the art without departing from the spirit of the present invention.

A first silicon controlled rectifier SCR1 21 acts to detect the presence of an arcing condition between the power line L and the metal sheath S1 and to switch solenoid SOL from its de-energized state to its energized state upon detecting the presence of the arcing condition between the power line L and the metal sheath S. First silicon controlled rectifier SCR1 preferably has a model number of EC103B and includes an anode 21, a cathode 23 and a gate 25.

In use, safety circuit 1011 functions in the following manner. In the absence of arcing conditions, switches K1 and K2 are disposed in their normally-closed positions, thereby enabling AC power to pass from the power source to the load through power and neutral lines L and N. Diode bridge 1013 maintains rectified power across solenoid SOL under normal operating conditions. Upon the presence of an arcing condition between power line L and metal sheath S, leakage voltage travels from metal sheath S and passes through resistor R1, resistor R1 dropping the leakage voltage to an acceptable level.

Voltage dropping resistor R1 preferably has a value of approximately 68 Kohms. The leakage voltage triggers SCR1 and causing power to be removed from solenoid SOL thereby opening switches K1 and K2 and preventing AC to pass from the source to the load. As an added safety measure MOV2 in series with a low value resistor R3 in parallel with SCR1 21 serves to dissipate any unwanted residual arcing voltage not suppressed by MOV1 and existing between power line L and metal sheath S. Upon the detection of such a residual arcing voltage, MOV2 will short and the residual voltage will be dissipated through low resistance R3 that will in turn burn out and open circuit.

Resistor R2 is connected in parallel with capacitor C1 and protection diode D22. In use, resistor R2 serves to reduce the likelihood of nuisance tripping in rectifiers SCR1 and diode bridge 1013.

A test circuit 215 is included in safety circuit 1011, test circuit 215 connecting power line L (at a location between sheath S1 and circuit breaker 13) to R1. Test circuit 215 comprises a test switch TEST. In use, test circuit 215 allows the user to test whether safety circuit 1011 is operating properly. Diode bridge 1013 comprises four diodes D91, D92, D93 and D94, each diode preferably having a model number of IN4004. Diode D92 includes a cathode 1021 connected to first end 17 of solenoid SOL. Diode 91 includes a cathode 1017 connected power line L, D94 has an anode 1027 connected to cathode 23 of SCR1, and a cathode 1029 connected to second terminal 63 of MOV1.

SCR1 includes an anode 21 connected to SOL second end 19 and a cathode 23 connected to MOV2 second end 25. MOV2 first end 27 connects to resistor 29 which connects to SOL second end 19. It should be noted that safety circuit 1011 differs from conventional electrical safety devices in that fireguard 1011 does not comprise a differential transformer rendering the fireguard circuit 1011 more compact in size and less expensive to manufacture than conventional electrical safety devices which utilize a differential transformer.

Figure 2:
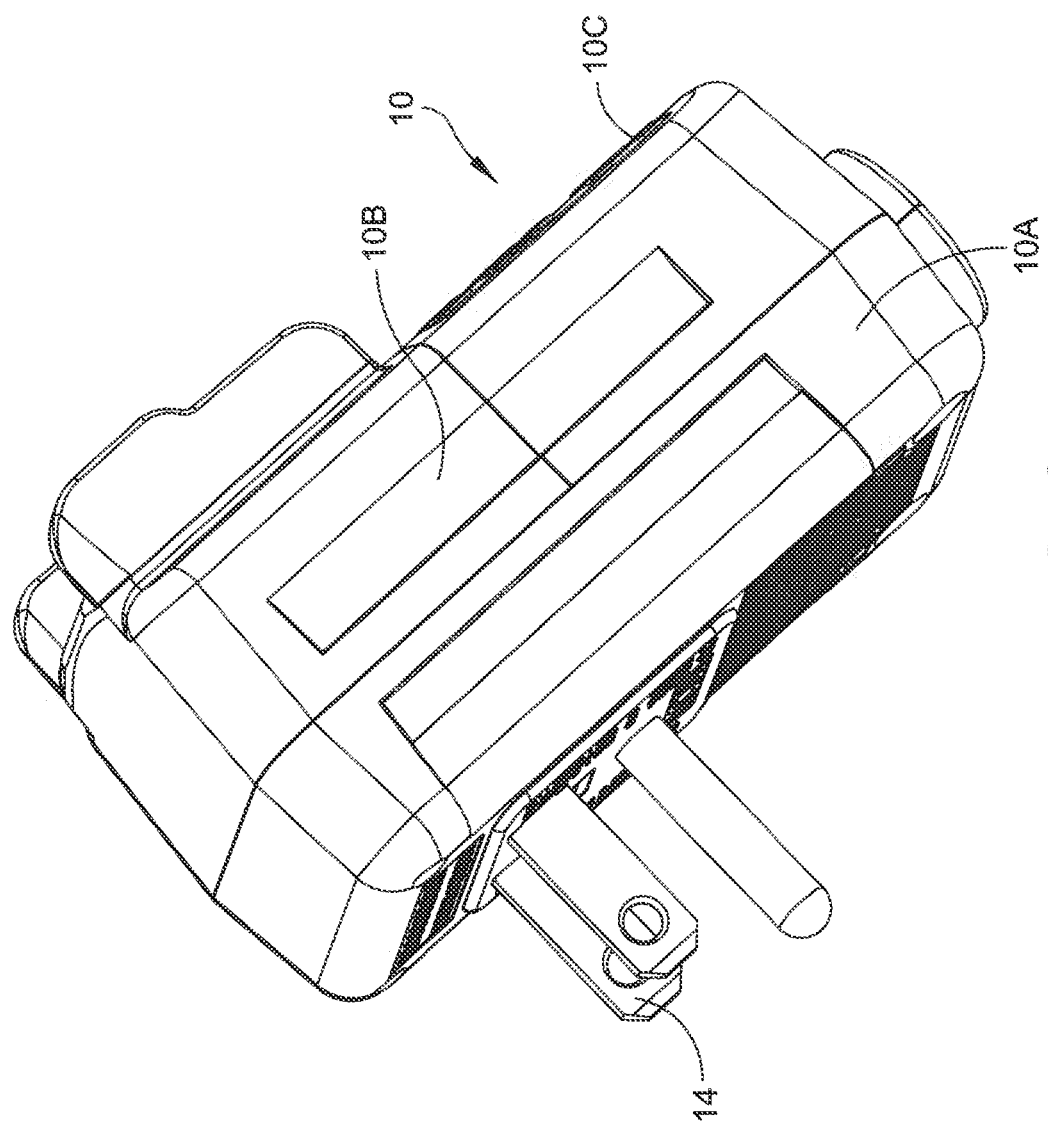
FIG. 2 is a side view of FIG. 1.
Figure 4:
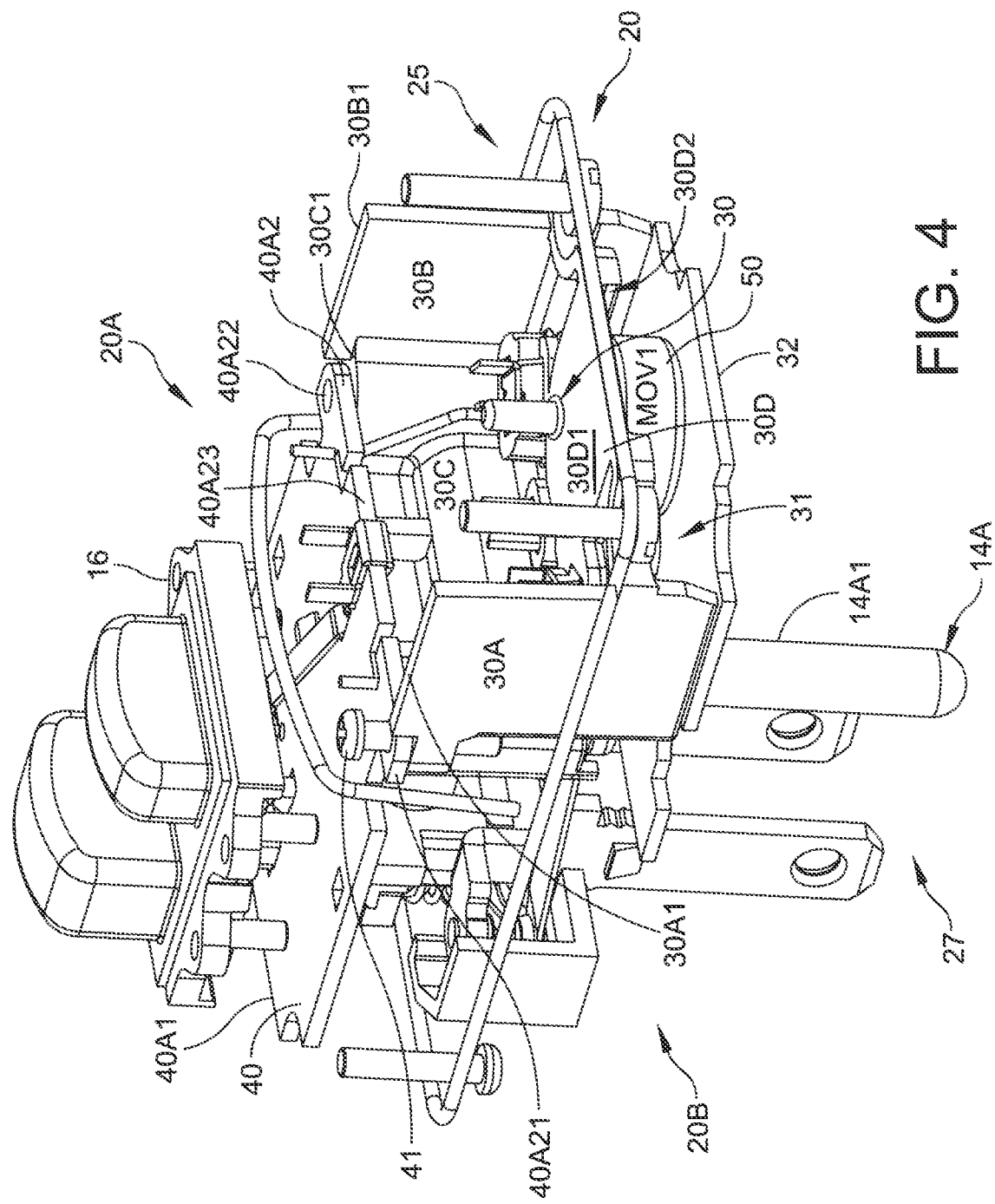
FIG. 4 is a perspective view of FIG. 1 with both top and bottom covers removed exposing circuit card assembly 20.
Figure 5:
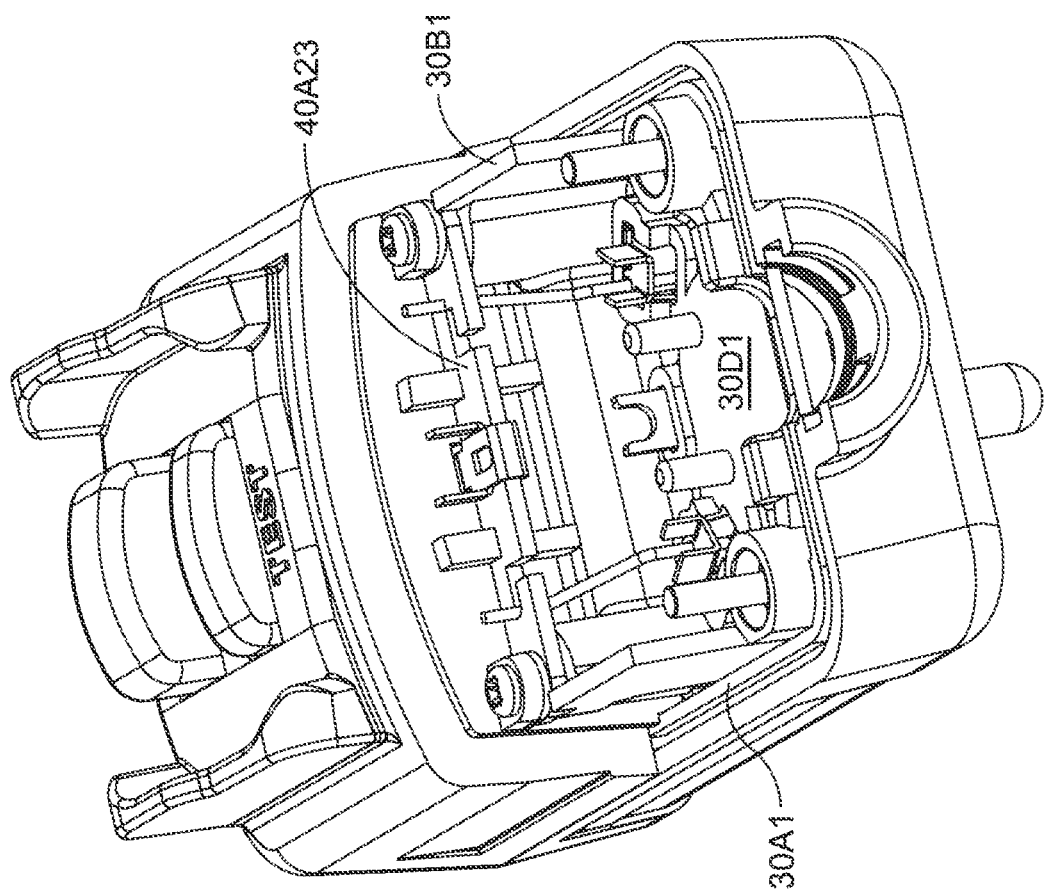
FIG. 5 is a perspective view of FIG. 1 with only the wire cover removed.

Referring to FIGS. 1 and 2, the LCDI of the present invention includes an external housing 10 used to encase the circuit card assembly 20 of FIG. 4. External Housing 10 includes bottom cover 10A, a top cover 10B, and a wire cover 10C. Wire cover 10C allows for easy access and quick connection of load types. The LCDI of the present invention is adaptable to support a variety of source input prong assemblies 14.

Figure 8:
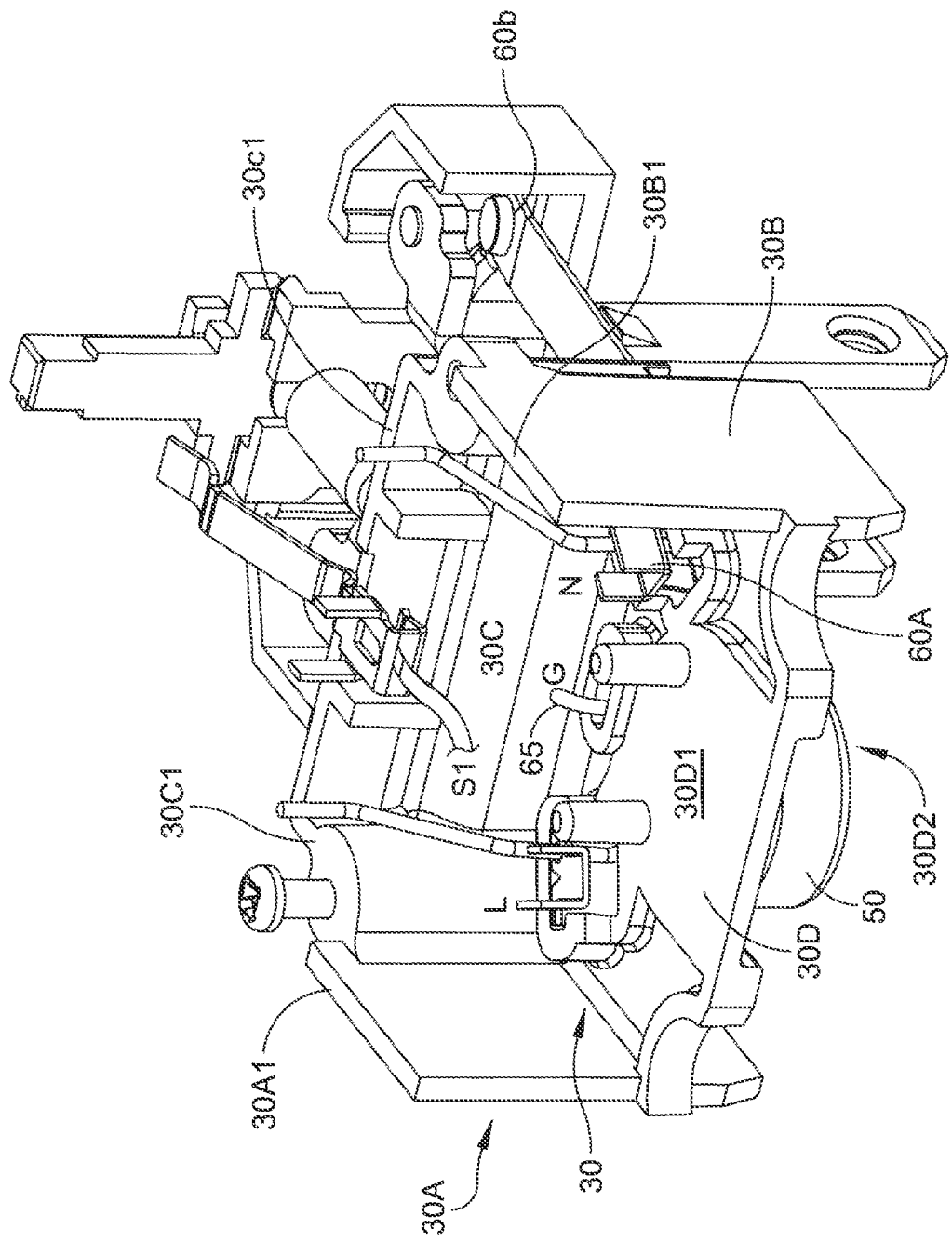
FIG. 8 is a partial view of FIG. 4 illustrating load input section 25.
Figure 9:
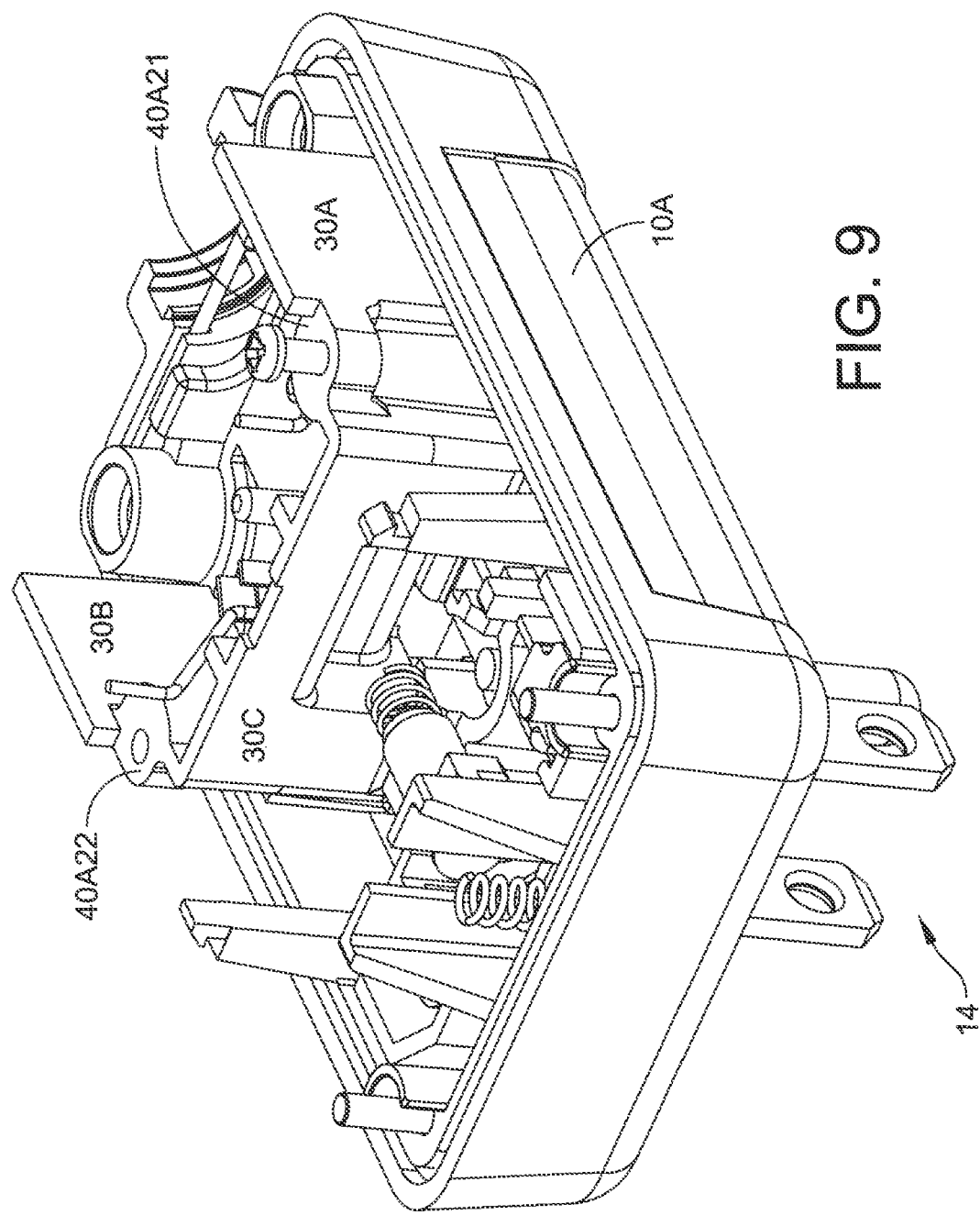
FIG. 9 is a partial view of FIG. 3 illustrating a rear view of load input section 25.
Figure 10:
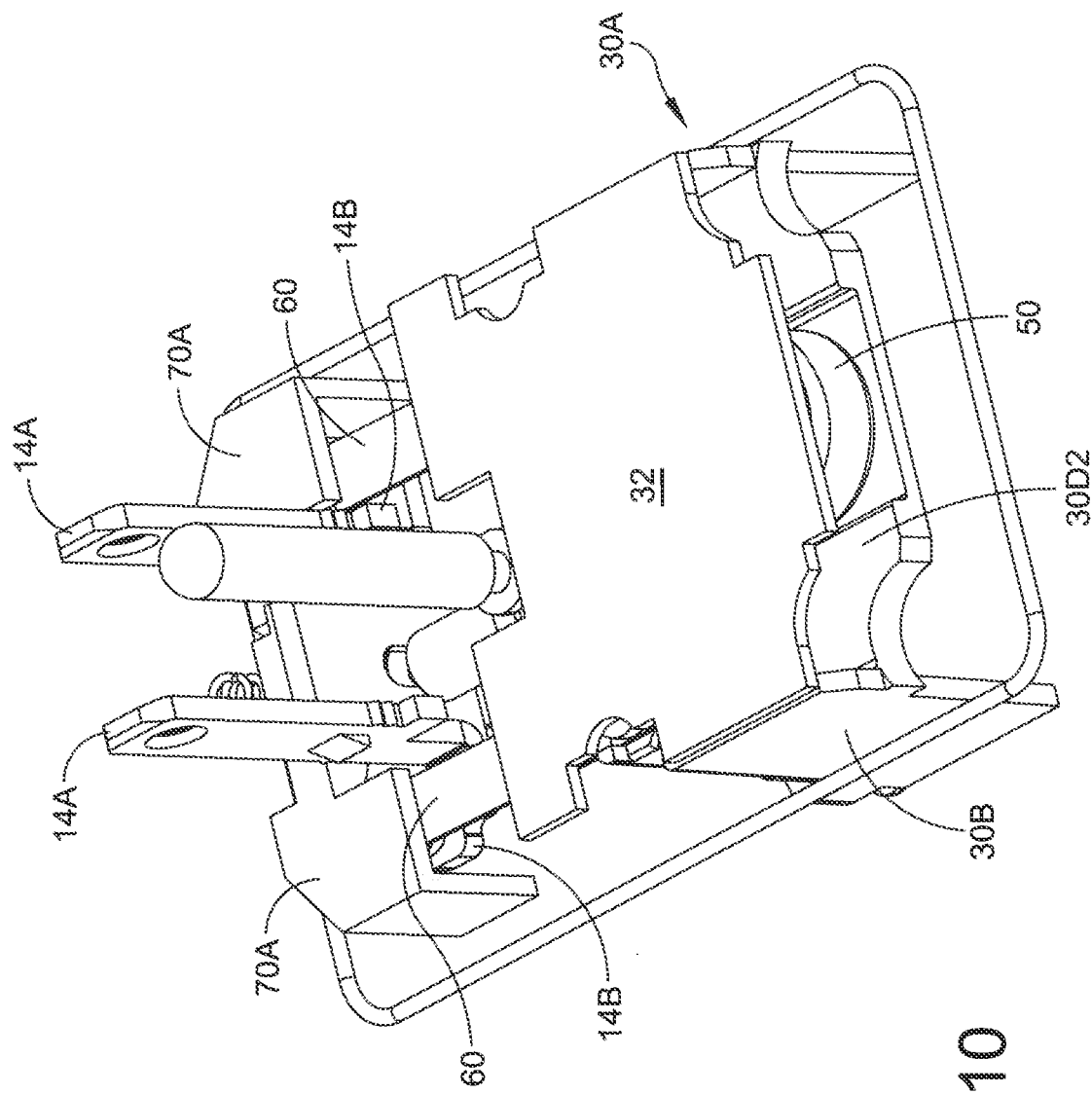
FIG. 10 is a partial view of FIG. 4 illustrating insulation plate 32.

FIG. 4 illustrates a circuit card assembly 20 having a top side 20A, a bottom side 20B, a load input section 25 and a source input section 27. Load Input section 25 includes a cavity 30, formed by left and right sidewalls 30A and 30B, a bottom wall 30D and a rear wall 30C. As illustrated in FIG. 8, bottom wall 30D includes a top surface 30D1 and a bottom surface 30D2, left and right sidewalls 30A and 30B include a top edge 30A1 and 30B1, and rear wall 30C includes a top edge 30C1. As illustrated in FIG. 8 and FIG. 10, sidewalls 30A and 30B, and rear wall 30C extend forward of bottom 30D2 and affix to insulation plate 32 to create a parallel fire barrier cavity 31 that encases MOV1 50.

Figure 3:
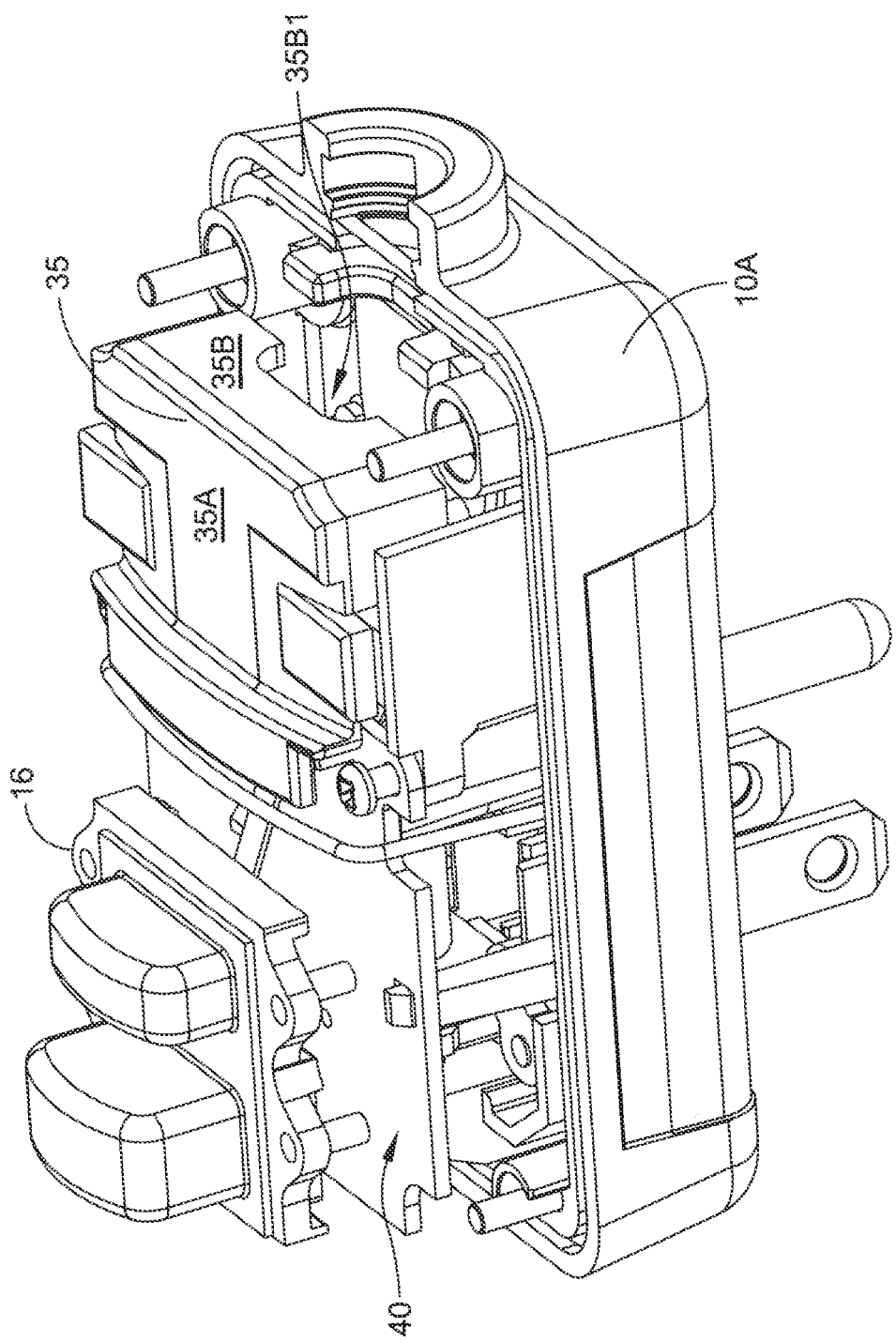
FIG. 3 is a perspective view of FIG. 1 with top covers removed exposing circuit card assembly 20.

Cavity 31 serves as a containment barrier for the high heat generated by MOV1 50 upon the presence of transient tripping voltages necessary to trip MOV1 50. Cavity 30 serves as a containment barrier for arcing conditions occurring either between power line L and metal sheath S1 or between neutral line N and metal sheath S1 that could result in a fire or other dangerous condition. Referring to FIG. 3, Cavity 30 encases load input conductors terminals L, N, and G, and sheathing S1. Cavities 30 and 31 can be made from any suitable fire retardant material, and in the preferred embodiment utilizes a phenolic material.

A cover 35 having a top wall 35A and a front wall 35B may be added for increased fire barrier protection and provides full encasement of cavity 30 leaving only enough space 35B1 for the passage of load, neutral, ground, and sheathing wires (not shown) to the L, N, G. and S1 connections present in load input section 25.

Figure 11:
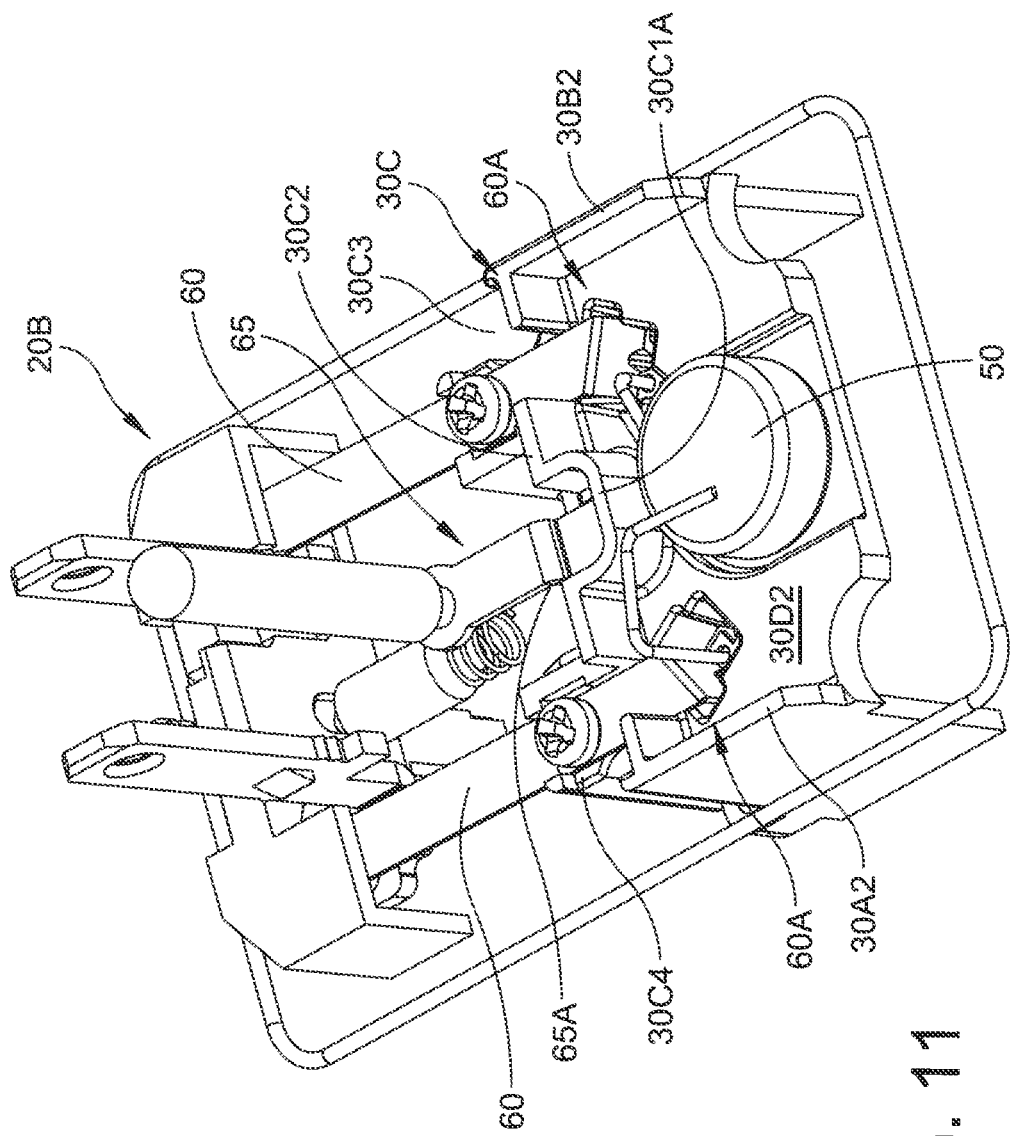
FIG. 11 is a partial view of FIG. 10 with insulation plate 32 removed.
Figure 12:
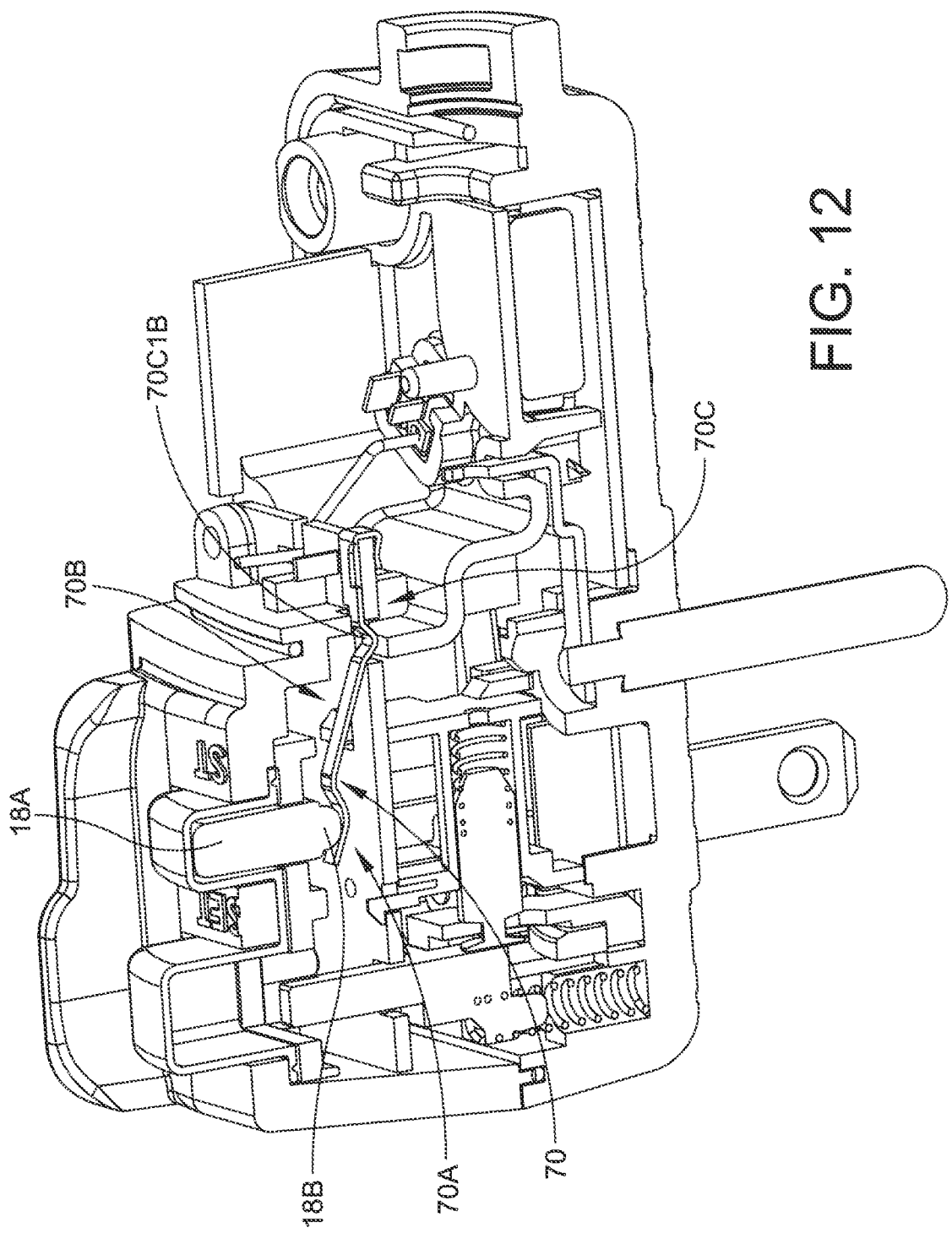
FIG. 12 is a cross-section of FIG. 1.

As illustrated in FIGS. 8 and 11, movable contact arms 60 are resiliently flexible and include at the source input section 27, an actuating member and latch to reciprocate source contact end 60B. Movable contact arms 60 extend from a load contact end 60A located interior to cavity 30, through cavity 30 to the interior of cavity 31, then through cavity 31 to source input section 27. Load contact ends 60A are bent orthogonally at a point interior to cavity 31 and pass through a slot 30C3 formed in rear wall 30C. Adjacent to slot 30C3 are located mounting bosses 30C4. Load contact end 60A is fixedly secured to mounting bosses 30C4 by screws or other means known in the art. Mounting bosses 30C4 placed adjacent to slot 30C3 and integrated as part of rear wall 30C imparts rigidity to load contact ends 60A while maintaining the resilient flexibility of source contact end 60B.

A ground conductor 65 extends from a first end interior to cavity 30, through cavity 30 and exiting through bottom side 20B at a point outside of cavity 31. Rear wall 30C includes a curved portion 30C 1A to isolate ground conductor 65 from the interior of cavity 31. Ground conductor 65 includes a stepped midpoint 65A that provides added isolation distance from ground to MOV1 50. Referring to FIG. 10, source contact prong assembly 14 includes line and Neutral conductors having an outlet end 14A and a circuit end 14B. Cavity 70A is for isolation and containment of both source contact prong circuit end 14B and movable contact arm 60 source contact end 60B. Cavity 70A provides containment of arcing conditions occurring either between power line L and metal sheath S or between neutral line N and metal sheath S that could result in a fire or other dangerous condition. Cavity 70A can be made from any suitable fire retardant material, and in the preferred embodiment utilizes a phenolic material.

Referring to FIG. 4, circuit card assembly 20 includes circuit board 40 incorporating the safety circuit of FIG. 13 thereon (circuit components not shown). The circuit board 40 includes a first peripheral edge 40A1 that extends to a second peripheral edge 40A2, where peripheral edge 40A2 is in abutment with top edge 30C1 of rear wall 30C and where circuit board 40 extends laterally over source input section 27. Peripheral edge 40A2 includes left and right ends 40A21 and 40A22, and a middle section 40A23. In the preferred embodiment circuit board 40 is secured to rear wall 30C at left and right ends 40A21 and 40A22 by screws 41.

Figure 6:
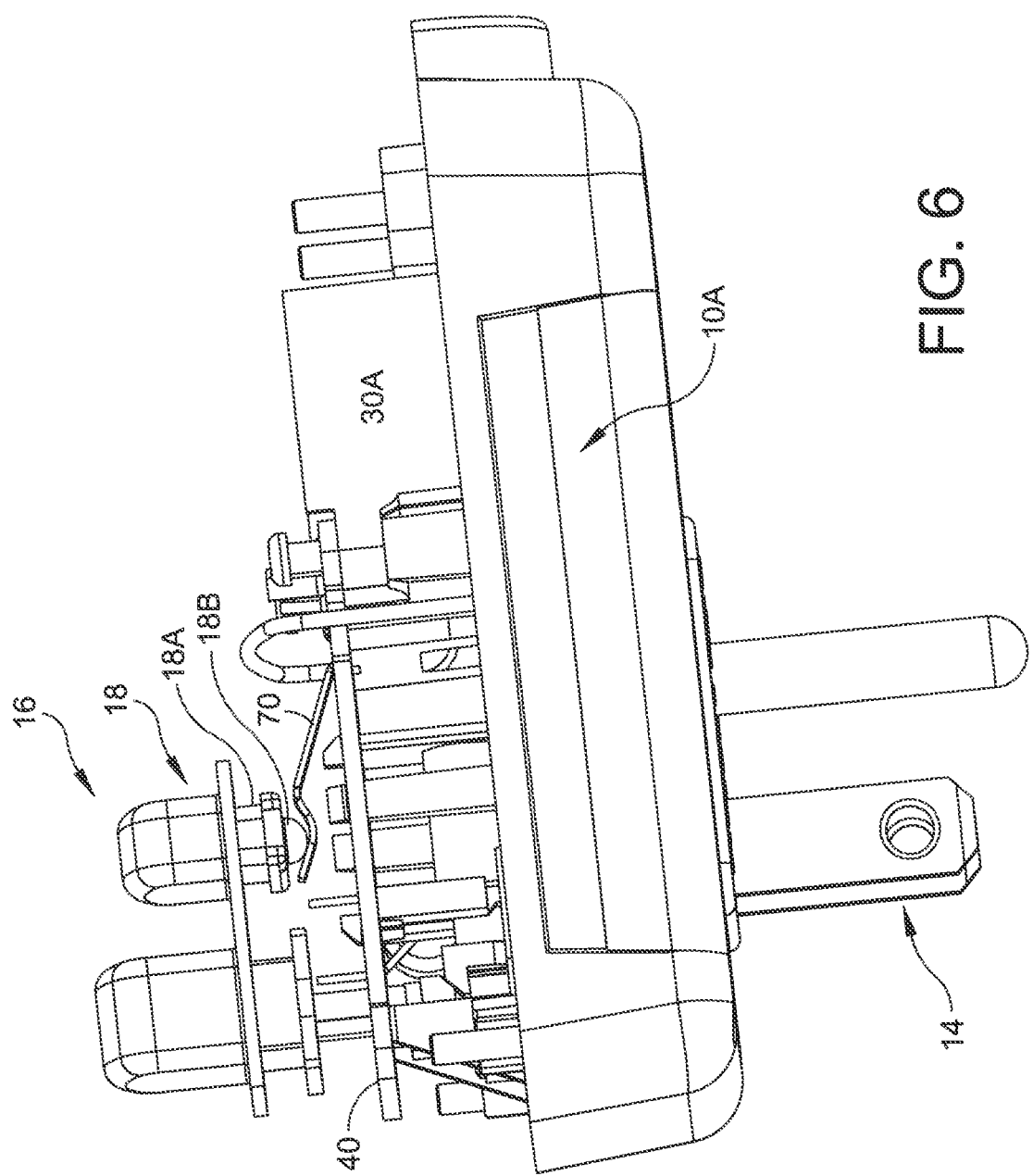
FIG. 6 is a side view of FIG. 3.
Figure 7:
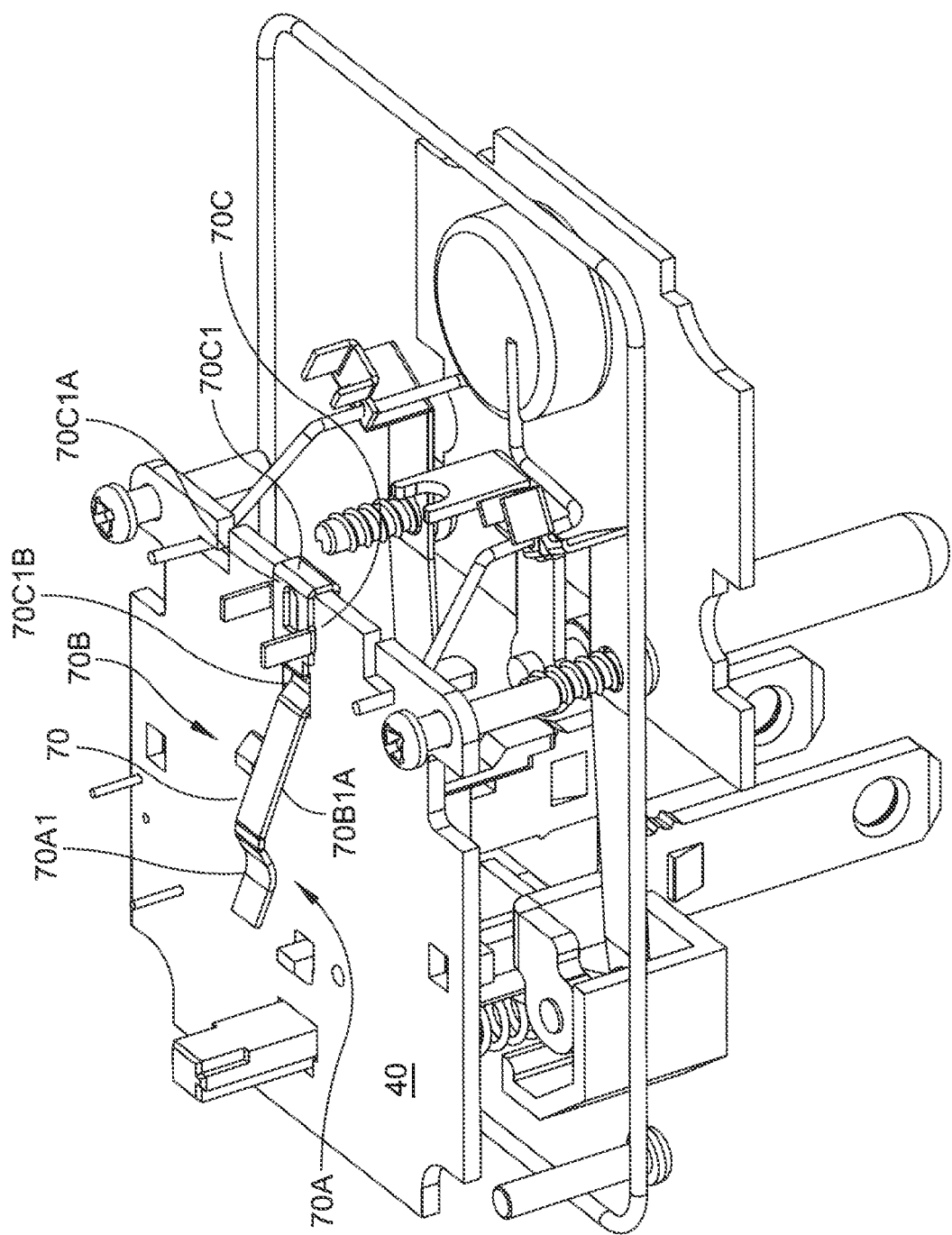
FIG. 7 is a partial view of FIG. 4 illustrating circuit board 40.

Referring to FIGS. 6 and 7, test contact arm 70 includes a first end 70A, a middle portion 70B and a second end 70C. Second end 70C includes a retainment jaw 70C1 that engages middle section 40A23 to secure test contact arm 70 to circuit board 40. Test contact arm 70 includes a straight top portion 70C1A that extends to a bent portion 70C1B, the bent portion 70C1B extending into the interior of circuit board 40 to support a resiliently flexible angled portion 70B1A. 70B1A is angled positively in relation to circuit board 40 and extends to a first end 70A. First end 70A includes a cupped portion 70A1 biased away from circuit board 70.

As illustrated in FIGS. 4 and 6, button assembly 16, is constructed as a one piece plastic mold having an curved button end 18B that sits in cupped portion 70A1. The weight of test button 18 is supported by test contact arm 70 in the non contact position (70A1 not engaging circuit board 70) until test button is pushed forcing 70A1 into engagement with circuit board 70. Upon release of test button 18 70A1 flexes back to a non-engaged position. Referring to FIG. 13, engagement of 70A1 with circuit board 40, causes test switch 215 to connect power line L (at a location between sheath S1 and circuit breaker 13) to R1 to switch solenoid SOL from its de-energized state to its energized state.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

I claim:

1. A leakage current detection and interruption (LCDI) device, for use as a safety device for a load cable, said load cable connecting a power source with a load, said load cable comprising a power line, a neutral line, a ground line, and a metal sheath which surrounds the power line and the neutral line, said LCDI device comprising a circuit card assembly including at least one Metal Oxide Varistors (MOVs) and adaptable for positioning within an external housing, the housing having a top cover, a bottom cover and a wire cover, the LCDI device comprising:

the circuit card assembly having a top, bottom, a load input section, said load input section comprising load input conductors, and a source input section, said circuit card assembly further including a circuit board, said load input section including a plurality of containment cavities formed on one end of said circuit board, at least one containment cavity comprising a load input conductor containment cavity, including a plurality of walls to surround said load input conductors, and at least one containment cavity comprising a Metal Oxide Varistors (MOV) containment cavity including a plurality of walls to surround said at least one Metal Oxide Varistor (MOV), wherein said load input conductor containment cavity plurality of walls includes a top wall, a bottom wall, and a plurality of side walls, and wherein said at least one Metal Oxide Varistors (MOVs) containment cavity plurality of walls includes a top wall, a bottom wall, and a plurality of side walls, wherein said bottom wall is common to said load input conductor containment cavity and said at least one Metal Oxide Varistors (MOVs) containment, cavities, wherein said bottom wall has a top and bottom surface, and wherein at least one of said plurality of side walls of said MOV containment cavity includes a rear wall extending outward from said bottom wall bottom surface, said rear wall including a plurality of openings, said plurality of moveable contact arms passing from said one end having load contacts contained in said load input containment cavity through said shared bottom wall and into said MOV containment cavity, said plurality of movable contact arms extending through said plurality of openings in said rear wall to said opposite end having source contacts;

said source input section including an actuating member positioned on an opposite end to the one end of said circuit board, said actuating member including a plurality of containment cavities therein, said plurality of containment cavities of said actuating member including a plurality of walls, said source input section further including a plurality of conductors having a first end and a second end, said first end for engagement into a power source, said second end surrounded by said plurality of walls of said plurality of containment cavities of said actuating member;

a plurality of movable contact arms, said movable contact arms having load contacts at one end, and having source contacts at an opposite end to the one end, said load contacts surrounded by, said plurality of walls of said plurality of containment cavities of said load input section, said source contact surrounded by said plurality of walls of said plurality of containment cavities of said actuating member, said source contacts of said plurality of movable contact arms and said second end of said plurality of source said plurality of conductors of said source input section adaptable for engagement and disengagement when said LCDI is operable;

wherein said load input conductor containment cavity, said plurality of containment cavities of said actuating member, and said MOV containment cavity are included as part of said circuit card assembly, said circuit card assembly adapted for fitment within said external housing.

2. The leakage current detection and interruption (LCDI) device as in claim 1, wherein said rear wall further includes a plurality of mounting bosses, said plurality of mounting bosses in alignment with said plurality of openings, said plurality of movable contact arms secured at said one end having load contacts to said plurality of mounting bosses.

3. The leakage current detection and interruption (LCDI) device as in claim 1, wherein said plurality of moveable contact arms include an orthogonal bend at a point of entry through said bottom wall.

4. The leakage current detection and interruption (LCDI) device as in claim 1, wherein said ground line includes a load contact end extending to a source contact end, said ground line extending from a load contact end from within said load input containment cavity through said bottom wall, to a position outside of said MOV containment cavity.

5. The leakage current detection and interruption (LCDI) device as in claim 4, wherein said ground line includes a stepped mid-portion, said stepped mid-portion located at said position outside said MOV containment cavity.

6. The leakage current detection and interruption (LCDI) device as in claim 1, wherein said rear wall further includes a top peripheral edge above said bottom wall top surface and wherein said circuit board of said circuit card assembly extends from a first end to a second end, said second end of said circuit board being in fixed engagement with said rear wall top peripheral edge, said circuit board extending laterally over said source input section.

7. The leakage current, detection and interruption (LCDI) device as in claim 6, further including a test contact arm, said test contact arm comprising a first end, a middle portion and a second end, said second end of said test contact arm comprising a retainment jaw, said retainment jaw secured to said second end of said circuit board wherein said test contact arm extends positively angled above said laterally extended circuit board, said test contact arm being resiliently flexible.

8. The leakage current, detection and interruption (LCDI) device as in claim 7, wherein said first end includes a cupped portion biased away from said circuit board.

9. The leakage current detection and interruption (LCDI) device as in claim 8, further including a test button, said test button including a curved end that rests in said cupped portion, said test button for forcing said contact arm first end in engagement with said circuit board, said test contact arm resiliently flexing back to said non engaged position upon release of said test button.

10. The leakage current detection and interruption (LCDI) device as in claim 1, wherein said circuit card assembly further includes:
   a) a circuit breaker comprising a first switch located in one of said lines between the power source and the load, said first switch having a first position in which the power source in its associated line is connected to the load and a second position in which the power source in its associated line is not connected to the load,
   (b) a circuit opening device for setting said first switch in either its first position or its second position, said circuit opening device being operable in either a first state or a second state, said circuit opening device setting said switch in its first position when in its first state and said circuit opening device setting said switch in its second position when in its second state,
   (c) a first silicon controlled rectifier (SCR) for detecting a presence of the arcing condition between the one of said lines and the metal sheath, said first SCR setting said circuit opening device at its second state upon detecting a presence of an arcing condition between one of said lines and the metal sheath, said first SCR comprising an anode, a cathode and a gate, and
   (d) a diode bridge connecting the first SCR to the circuit opening device, the diode bridge acting to detect a presence of an arcing condition between an other of said lines and the metal sheath, said diode bridge setting said circuit opening device at its second state upon detecting the presence of the arcing condition between the other of said lines and the metal sheath.

11. The leakage current detection and interruption (LCDI) device as in claim 1, wherein said load input conductor containment cavity, said plurality of containment cavities of said actuating member, and said MOV containment cavity are made from a fire retardant phenolic material.

* * * * *